US007345010B2

(12) United States Patent
Thompson et al.

(10) Patent No.: US 7,345,010 B2
(45) Date of Patent: Mar. 18, 2008

(54) COMPOSITIONS FOR DRILLING FLUIDS USEFUL TO PROVIDE FLAT TEMPERATURE RHEOLOGY TO SUCH FLUIDS OVER A WIDE TEMPERATURE RANGE AND DRILLING FLUIDS CONTAINING SUCH COMPOSITIONS

(75) Inventors: Jeffrey Thompson, East Windsor, NJ (US); David Dino, Cranbury, NJ (US); Richard Jobbins, Freehold, NJ (US); Mark Matyi, Jr., North Hanover, NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 31 days.

(21) Appl. No.: 10/304,167

(22) Filed: Nov. 27, 2002

(65) Prior Publication Data
US 2004/0110642 A1 Jun. 10, 2004

(51) Int. Cl.
*C09K 8/22* (2006.01)
(52) U.S. Cl. ............... 507/131; 507/133; 507/244; 507/246
(58) Field of Classification Search .......... 507/131, 507/133, 244, 246
See application file for complete search history.

(56) References Cited

U.S. PATENT DOCUMENTS

| 2,461,730 | A | * | 2/1949 | Gunderson | 516/131 |
|---|---|---|---|---|---|
| 2,994,660 | A | * | 8/1961 | Reddie et al. | 507/131 |
| 3,134,759 | A | * | 5/1964 | Kirkpatrick et al. | 530/231 |
| 3,514,399 | A | * | 5/1970 | Robinson | 507/130 |
| 4,039,459 | A | * | 8/1977 | Fischer et al. | 507/102 |
| 4,505,833 | A | * | 3/1985 | Lipowski et al. | 507/105 |
| 4,508,628 | A | | 4/1985 | Walker et al. | |
| 5,260,268 | A | | 11/1993 | Forsberg et al. | |
| 5,330,662 | A | * | 7/1994 | Jahnke et al. | 507/244 |
| 5,536,871 | A | * | 7/1996 | Santhanam | 560/196 |
| 5,599,777 | A | * | 2/1997 | Jahnke et al. | 507/244 |
| 5,620,946 | A | * | 4/1997 | Jahnke et al. | 507/131 |
| 5,710,110 | A | * | 1/1998 | Cooperman et al. | 507/131 |
| 5,909,779 | A | | 6/1999 | Patel et al. | |
| 5,939,475 | A | * | 8/1999 | Reynolds et al. | 524/230 |
| 6,291,406 | B1 | | 9/2001 | Rose et al. | |
| 6,291,663 | B1 | | 9/2001 | Nakamura | |
| 6,339,048 | B1 | * | 1/2002 | Santhanam et al. | 507/131 |
| 6,462,096 | B1 | | 10/2002 | Dino et al. | |
| 6,589,917 | B2 | | 7/2003 | Patel et al. | |

FOREIGN PATENT DOCUMENTS

| EP | 1018534 | 7/2007 |
|---|---|---|
| WO | WO 89/11516 A * | 11/1989 |

OTHER PUBLICATIONS

J. W. Jordan, "Proceedings of the 10th National Conference on Clays and Minerals" Pergamon Press, Austin (1963) pp. 299-308.

* cited by examiner

*Primary Examiner*—Kuo-Liang Peng
(74) *Attorney, Agent, or Firm*—Morgan, Lewis & Bockius LLP

(57) ABSTRACT

The invention is of oil-based drilling fluids including invert emulsion fluids that are able to maintain a relatively consistent rheological profile over a wide temperature range. The invention also includes new additives that enable the preparation of drilling fluids with viscosities that are less affected by temperature over a temperature range from less than about 40° F. to more than about 250° F. compared to conventional fluids. These additives are based on reaction products of polyamines and carboxylic acids with two or more carboxylic moieties combined with alkoxylated amines and fatty acid amides. In addition, this invention permits the use of reduced amounts of organoclay rheological additives in drilling fluids.

19 Claims, No Drawings

COMPOSITIONS FOR DRILLING FLUIDS USEFUL TO PROVIDE FLAT TEMPERATURE RHEOLOGY TO SUCH FLUIDS OVER A WIDE TEMPERATURE RANGE AND DRILLING FLUIDS CONTAINING SUCH COMPOSITIONS

FIELD OF THE INVENTION

This invention relates to compositions suitable for use as additives for drilling fluids, and to drilling fluids comprising said compositions having improved rheological properties. The invention also relates to additives that provide rheological properties to drilling fluids relatively independent of the varying temperatures encountered in oil well drilling operations at various depths, particularly in deep water drilling.

BACKGROUND OF THE INVENTION

Drilling fluids have been used since the very beginning of oil well drilling operations in the United States and drilling fluids and their chemistry have been and remain an important area for scientific and chemical investigations. The use and desired properties of drilling fluids are comprehensively reviewed in recent U.S. Pat. Nos. 6,339,048 and 6,462,096, issued to the assignee of this application, the entire disclosures of which are incorporated herein by reference.

A drilling fluid is a thixotropic system and exhibits low viscosity when sheared during cutting of the hole into the ground, during agitation and circulation but, when such shearing action is halted, must quickly thicken to among other things hold the "cuttings" from the drill hole in place without sinking. The fluid must therefore become thick rapidly, reaching sufficient gel strength before such suspended materials fall any significant distance. Importantly, this behavior must be totally reversible at all temperatures encountered in the borehole. In addition, even when the drilling fluid is free flowing, it must retain a sufficiently high viscosity to carry all cuttings and other particulate matter from the bottom of the hole back up to the surface.

Since the end of the second World War, hydrocarbon drilling for exploratory and production wells has increasingly been done from platforms located in water settings, often called off-shore drilling. Such fresh and salt water drilling employs floating barges and rigs often fixed in some fashion to the submerged surface of the earth.

Economic and technical advances have recently pushed these drilling operations into deeper waters. Although advances in equipment and engineering have yielded technology capable of drilling in water depths up to 10,000 feet or more, advances required in drilling fluid technology have lagged.

A major problem with oil-based drilling fluids in deepwater drilling is rheological additive temperature sensitivity over the temperature range encountered. During circulation, the drilling fluid typically reaches bottom hole temperatures of about 60 to 80° C. followed by cooling to lower than 5° C. in the riser during its travel upward (due to the inherent low temperature of sea water far below the ocean surface). For successful deepwater drilling, the mud needs to simultaneously suspend the solids and remain pumpable with proper viscosity over these wide temperature ranges.

Drilling fluids thickened with conventional organophilic clay rheological additives particularly suffer considerable viscosity build as the drilling fluid is cooled from a temperature of 60 to 5° C., for example. As a result of this viscosity increase, the drilling fluid, when it reaches low temperatures, is more difficult to pump, the equivalent circulating density (ECD) is increased and losses to the formation (lost circulation) frequently increase.

The requirements for drilling fluids with enhanced temperature properties have also become more complex over the past two decades as a result of changes in directional drilling technology, in which a well is drilled at an angle other than vertical. Such wells are widely known as deviated wells.

Methods for drilling deviating wells have changed greatly over recent years with the production of more powerful and reliable downhole motors, and the invention of more accurate methods utilizing wireline techniques as well as the highly computerized downhole, sensing and micro reduction equipment, including improvements in sounding apparatus and microwave transmission. These techniques permit the instantaneous acquisition of data relating to down-hole conditions without the need to remove the drill string and in fact mean that holes can, and are, drilled at ever increasing lengths.

The advantages of directional drilling include (1) directional drilling allows tapping of fields which cannot effectively be reached by vertical drilling; (2) such drilling permits the use of more economical land-based equipment to explore the immediate off-shore environment; and (3) such drilling make possible the drilling of multiple wells up to several miles from one another, sharing the cost of a single site. In addition, in certain geological formations, increased production can be achieved by deviating the well off-vertical so as to facilitate perforation and development of a narrow producing zone, or redevelopment of a depleted formation.

Use of a downhole motor allows the hole to be deviated by the introduction of a fixed offset or bend just above the drill bit. This offset or bend can be oriented by modern MWD systems which are capable of reporting accurately the current bit and toolface hole angle and azimuth (i.e. the orientation with respect to the upper portion of the hole). It is accordingly possible to rotate the drill string until the toolface has achieved the desired direction of deviation, and then to fix the drill string in place and commence the deviation by starting the motor to extend the hole in the desired deviated direction.

There are, however, a number of inherent problems in the use of directional drilling, which affect the requirements of a drilling mud; namely:

As in deep water drilling, increased ranges of temperatures are encountered.

The annulus carrying the mud to the surface is no longer vertical and extends to far greater distances versus vertical wells.

Gravity on a horizontal hole pulls cuttings, weighting material and particulate matter, not controlled by the drilling fluid, to the bottom side of the bore (not the bottom of the hole as in traditional drilling) and results in drag on the bore wall.

The amount of drilling mud required is increased since the distances are greater, and the time required for the mud to reach the earth's surface also increases.

Curves and kinks in the hole's direction can accumulate cuttings and additives.

In order to obviate or mitigate these problems, which can cost oil and gas companies millions of dollars per hole, it is an object of the invention to provide drilling fluids with rheological properties particularly appropriate for directional drilling including the improved viscosity stability with temperature discussed above.

For background, it has been long known that organoclays (also called organophilic clays) can be used to thicken drilling fluids. See the very early article by the employee of the assignee hereof J. W. Jordan, "Proceedings of the 10th National Conference on Clays and Clay Minerals" (1963), which discusses a wide range of drilling applications of organoclays from high polarity liquids to low polarity liquids.

Previously mentioned U.S. Pat. No. 6,462,096 discloses oil-based invert emulsion drilling fluids that provide more stable drilling fluid viscosity and anti-settling performance over varying temperatures when compared to conventional fluids containing organoclays.

Patents of the prior art that show developments related to either drilling fluids or chemistry of additives include the following:

U.S. Pat. No. 3,514,399 teaches the use of a mixed dimer acid-monocarboxylic acid salt of an imidazoline in a drilling fluid.

U.S. Pat. No. 5,260,268 describes a product introduced into a well borehole which encompasses water-based drilling fluids and shows a composition comprised of a polycarboxylic acrylating agent reacted with an amine-terminated polyethylene of a molecular weight average from 600 to 10,000. While ethoxylated amines are discussed as a surfactant which may be used in conjunction with the composition, there is no teaching of applications in an oil-based invert emulsion drilling fluid.

U.S. Patent Application Publication No. 2001/0009890 shows an invert emulsion suitable for drilling a subterranean well which uses an ester of a $C_1$ to $C_{12}$ alcohol and a $C_8$ to $C_{24}$ monocarboxylic acid—Ethomeen C/15 can be used as an agent in the invention described in the application.

U.S. Pat. No. 5,536,871 issued to the assignee hereof describes a rheological additive which comprises the reaction product of a polyalkoxylated nitrogen-containing compound such as polyoxyethylene (5) cocoalkylamine, a polycarboxylic acid including dimer acids and a liquid diamine.

U.S. Pat. No. 5,610,110 also issued to assignee hereof shows an improved drilling fluid containing a reaction product of an alkoxylated aliphatic amino compound and an organic polycarboxylic acid and a clay based organoclay.

U.S. Pat. No. 5,909,779 at Col. 4, lines 55 to Col. 5, line 15 contains a large laundry list of surfactants, wetting agents and viscosifying agents conventionally used in oil-based drilling fluids including fatty acids, polyamines, imidazoline derivatives and polycarboxylic acids and soaps of fatty acids.

Recent Dow Chemical Company U.S. Pat. No. 6,291,406 describes a well treatment fluid using an amine surfactant to provide a sufficiently stable emulsion. Ethomeens are discussed, particularly bis(2-hydroxyethyl) cocamines and oleyamines.

Commercial rheological drilling fluid additives presently available on the market, however, tend to have increased viscosity while the fluid temperature is low, requiring increased pump pressure which in turn causes increased wear of the drilling gear. Increased pumping horsepower becomes necessary to pump drilling muds through long distances, and increased down-hole pressure under pumping conditions increases fluid loss, fracturing and damage of the formation. Prior art methods of reducing drilling fluid viscosity are not satisfactory because the resultant drilling fluids fail to maintain adequate suspension characteristics when the fluid temperature changes, for example, at downhole conditions.

There is clearly an unfilled need which has been growing in the past decade for drilling fluids that are able to maintain a relatively consistent rheological profile over a wide temperature range; it is believed that the below unexpected described invention fills this need.

SUMMARY OF THE INVENTION

The invention herein covers new additives that enable the preparation of drilling fluids with viscosities that are less affected by temperature over a temperature range from less than about 40° F. to more than about 250° F. compared to conventional fluids. In addition, this invention permits the use of reduced amounts of organoclay rheological additives with the attendant reduction in cost. In fact, in some cases organoclays can be completely eliminated.

According to one aspect, this invention provides a mixture composition comprising as the first ingredient the reaction product of a di-, tri- or polyamine with an acid containing at least two carboxyl functional groups to form a polyamide and as the second mixture ingredient an alkoxylated alkylamine. The alkoxylated amine can be added to the polyamide before, during, or after its synthesis or added directly to the drilling mud as a separate component.

According to another aspect, this invention provides a mixture composition comprising the reaction product of a di-, tri- or polyamine with an acid containing at least two carboxyl functional groups to form a polyamide and as the second ingredient either (a) a fatty amide or (b) a mixture of a fatty amide and alkoxylated alkylamine which can be added to the polyamide before, during or after its synthesis or added to the drilling mud as a separate component.

In yet another aspect, this invention provides a reaction product comprising a di-, tri- or polyamine, an acid containing at least two carboxyl functional groups and an alkoxylated alkylamine.

In another aspect, this invention provides a reaction product comprising a di-, tri-, or polyamine, an acid containing at least two carboxyl functional groups, an alkoxylated alkylamine and a fatty amide. The fatty amide can be added prior, during or after the reaction or added directly to the drilling mud as a separate component.

A further embodiment of the invention provides for a drilling fluid composition comprising an oil-based mud in which the above inventive reaction products are present individually or in combination.

DETAILED DESCRIPTION OF PREFERRED EMBODIMENTS

The invention provides compositions that reduce the effects of temperature on the viscosity of an invert emulsion drilling fluid. The viscosity vs. temperature profile is maintained more uniformly from less than about 40° F. to greater than about 250° F. for extended periods of time. When used in combination with organophilic clay, the invention maintains characteristics associated with organophilic clays in oil and synthetic based drilling fluids.

Additionally, the additive has strong value in deep-water drilling. Among the main positive attributes are the reduced high and low shear viscosity at sub-ambient temperatures as compared to a drilling mud exhibiting similar rheological properties at ambient temperature with just organoclay alone as the rheological agent. This reduced viscosity at low temperature leads to a greater ability to control formation pressure while minimizing the risk of lost returns.

The term "drilling fluid" conventionally denotes any of a number of liquid and gaseous fluids and mixtures of fluids and solids (as solid suspensions, mixtures and emulsions of liquids, gases and solids) used in operations to drill boreholes into the earth. It is synonymous with "drilling mud" in general usage.

This invention particularly covers generally petroleum or synthetic oil-based drilling fluids we call oil based drilling fluids. More particularly, it relates to an oil based drilling fluid often referred to as an invert emulsion drilling fluid, which is a water in oil emulsion whose continuous phase is oil. The water phase, or internal phase, is typically a brine for example 25% calcium chloride. This water or brine phase can range from 0% in all oil muds to in excess of 50% in invert emulsion drilling fluids.

An important embodiment of this invention relates to a drilling fluid containing a composition which is a mixture or blend of (1) a reaction product of a specific polyamine and a carboxylic acid with at least two carboxylic moieties and (2) an alkoxylated amine. The use of this unique mixture as an additive for an invert emulsion drilling fluid surprisingly improves the fluid's rheological properties. The resultant drilling fluids have a relatively constant viscosity over a wide temperature range. More surprisingly, the viscosity of the drilling fluid of the invention is relatively low at reduced temperatures while providing sufficient viscosity under downhole temperatures to reduce barite sag and suspend drill cuttings.

The additive comprises the following. First discussed are the components of the reaction product and its production.

Fatty Acids

Any carboxylic acid with at least two carboxylic moieties can be used for producing the reaction product component of the present invention. Dimer acids are preferred; dimer acids of $C_{16}$ and $C_{18}$ fatty acid are particularly preferred. Such dimer acids can be fully hydrogenated, partially hydrogenated, or not hydrogenated at all. Useful dimer acids also include products resulting from the dimerization of $C_{16}$ to $C_{18}$ unsaturated fatty acids.

Generally when used, the dimer acids preferably have an average from about 18, preferably from about 28 to about 48 and more preferably to about 40 carbon atoms. Most preferably dimer acids have 36 carbon atoms.

Useful dimer acids are preferably prepared from $C_{18}$ fatty acids, such as oleic acids. Useful dimer acids are described in U.S. Pat. Nos. 2,482,760, 2,482,761, 2,731,481, 2,793,219, 2,964,545, 2,978,4681, 3,157,681, and 3,256,304, the entire disclosures of which are incorporated herein by reference.

Examples of most preferred dimer acids include the Empol® product line available from Cognis, Inc., Pripol™ dimer acids available from Uniqema and HYSTRENE® dimer acids formerly available from Humko Chemical.

It is recognized that commercially available dimer fatty acids contain a mixture of monomer, dimer, and trimer acids. Preferably, in order to achieve optimal results, the dimer fatty acid used has a specific dimer acid content as increased monomer and trimer concentration hinder the additive's performance. A person of ordinary skills in the art recognizes that commercial products may be distilled or otherwise processed to ensure certain dimer content. Preferably, suitable dimer acid has a dimer content of at least 80%, more preferably above 90%.

Empol® 1061 with a dimer acid content of 92-96% is the preferred dimer acid for the present invention.

Polyamines

Polyamines having an amine functionality of two or more are used for the preparation of the reaction product of the present invention. Most preferably, polyamines from the family of polyethylene polyamines having a amine functionality of two or more should be used.

Di-, tri-, and polyamines and their combinations are most suitable for use in this invention. Representative such amines include ethylenediamine, diethylenetriamine, triethylenetetramine, tetraethylenepentamine and other members of this series. Branched polyamines and polyamines made with different alkyl groups can be used.

Triamines are most preferable, particularly diethylenetramine (DETA). DETA has been assigned a CAS No. of 111-40-0. It is commercially available from Huntsman International.

Making the Reaction Product

Specifics on processing of polyamines and carboxylic acids are well known and can be used in making the reaction product of this invention. Preferably, the molar ratio between the amine functional group and carboxyl functional group is between 4:1 and 1:1. The preferred range is from 1:5:1.0 to 3:1, most preferably about 2:1. For example, mixtures of more than one dimer acid and/or more than one polyamine can be used. A representative manufacturing process is illustrated in the examples following hereafter. It should be noted that these reactions may generate imidazolines and other side products.

Alkoxylated Amines

Important to this invention in an important embodiment is that a suitable alkoxylated alkyl amine is mixed into or blended into the reaction product produced by the reaction of the carboxylic acid with the polyamine as described above or is otherwise added directly to the drilling mud.

Many alkyl alkoxylated amines are suitable for the present invention.

Any alkoxylated amine or similarly derivitized amines may be used. Suitable alkoxylated amines include amines of various degrees of alkoxylation. Representative useful chemicals include the entire Ethomeen®, Propomeen® and the Ethoduomeen® product lines of Akzo Nobel.

Preferred are amines with up to about 50 units of alkoxylation per molecule (e.g. Ethomeen® 18/60). More preferred are amines with up to about 15-25 units of alkoxylation (e.g. Ethomeen® C/25, T/25, S/25, 18/25; Ethoduomeen® T/25). Most preferred are amines with up to about 10 units of alkoxylation (e.g. Propomeen® C/12, O/12, T/12; Ethoduomeen® T/13, T/20; Ethomeen® C/12, C/15, C/20, O/12, O/15, T/12, T/15, S/12, S/15, S/20, 18/12, 18/15 and 18/20).

The most preferred amines are polyoxyethylene (5) cocoalkylamines, available, for example, under the tradename Ethomeen® C/15 from Akzo Nobel (New Brunswick, N.J.). Ethomeen® C/15 has a general formula of $RN[(CH_2CH_2O)_m][CH_2CH_2O)_n H]$ wherein R is cocoalkyl, and m+n=5.

Optionally, the alkoxylated amine may be added prior to the reaction between the dimer acid and polyamines, or blended after the reaction step. If added prior to the reaction or at the reaction temperature, some esters may be formed between the dimer acid carboxyls and the alkoxylated amine hydroxyls.

In a preferred embodiment, the two components are mixed or blended in a weight ratio range of 95:5 to 5:95. The preferred ratio range is 80:20 to 30:70 and the most preferred ratio is 55:45 reaction product to alkoxylated amine.

Fatty Amides

Optionally, additional ingredients such as fatty amides and related alkoxylated derivatives can be blended into or reacted with the polyamide reaction product.

Suitable fatty amides, such as the Armid® product line by Akzo Nobel includes high temperature melting amides of fatty acids that are sparingly soluble in drilling muds. Additionally, alkoxylated fatty amides, such as the Ethomid® product line by Akzo Nobel can be used.

While the above is the preferred formulation, other compositions of varying molar ratios of raw materials can be used. Additionally, alternate commercial dimer fatty acids can be reacted with various amines to generate the reaction polymer. It however should also be noted that the alkoxylated amine could be reacted with the dimer acid/diethylenetriamine polymer generating compositions which can be further modified by blending amine derivatives (e.g. fatty amides) and this is intended to be included in this invention.

Preparation of the Drilling Fluids

The compositions of this invention described above will be used primarily as an additive to oil-based drilling fluids and most particularly for oil-based invert emulsion drilling fluids employed in a variety of drilling applications. The term oil-based drilling fluid is defined as a drilling fluid in which the continuous phase is hydrocarbon based. Oil-based fluids formulated with over 5% water or brine are classified as oil-based invert emulsion drilling fluids. Commonly, oil-based invert emulsion drilling fluids will contain water or brine as the discontinuous phase in any proportion up to about 50%.

A process for preparing invert emulsion drilling fluids (oil muds) involves using a mixing device to incorporate the individual components making up that fluid. Primary and secondary emulsifiers and wetting agents (surfactant mix) are added to the base oil (continuous phase) under moderate agitation. The water phase, typically a brine, is added to the base oil/surfactant mix along with alkalinity control agents and acid gas scavengers. Rheological additives as well as fluid loss control materials, weighting agents and corrosion inhibition chemicals may also be included, and the agitation is continued to ensure dispersion of each ingredient and homogenize the resulting fluidized mixture.

Suitable Oil Base

Diesel oil, mineral oil, synthetic oil, vegetable oil, fish oil, paraffinics, and/or ester-based oils can all be used as single components or as blends.

Suitable Brine Content

Water in the form of brine is often used in forming the internal phase of these type fluids. Water can be defined as an aqueous solution which can contain from about 10 to 350,000 parts-per-million of metal salts such as lithium, sodium, potassium, magnesium, cesium, or calcium salts. The preferred brines used to form the internal phase of the preferred fluid of the invention can also contain from about 5 to about 35% by weight calcium chloride and may contain various amounts of other dissolved salts such as sodium bicarbonate, sodium sulfate, sodium acetate, sodium borate, potassium chloride, sodium chloride or formates (sodium, calcium, or cesium).

The ratio of water (brine) to oil in the emulsions of the invention should generally provide as high a brine content as possible while still maintaining a stable emulsion. Oil/brine ratios in the range from about 97:3 to about 50:50 have been found to work satisfactorily, depending upon the particular oil and mud weight. Thus the water content of a typical drilling fluid prepared according to the teachings of the invention will have an aqueous (water) content of about 0 to 50 volume percent.

Suitable Emulsifiers

In order to form a more stable emulsion, a emulsifier can also be added to the external, the internal or both phases of the drilling fluid. The emulsifier is preferably selected from a number of organic acids which are familiar to those skilled in the drilling fluid area, including the monocarboxyl alkanoic, alkenoic, or alkynoic fatty acids containing from 3 to 20 carbon atoms, and mixtures thereof. Examples of this group of acids include stearic, oleic, caproic, capric and butyric acids. Adipic acid, a member of the aliphatic dicarboxylic acids can also be used. More preferred surfactants or emulsifiers include fatty acid calcium salts and lecithin. Most preferred surfactants or emulsifiers include oxidized tall oil, polyaminated fatty acids, and partial amides of fatty acids.

An important class of heterocyclic additives which we believe assist in regulating the flow properties of the drilling muds according to the invention are the imidazoline compounds. Other important members of this heterocylic group are alkylpyridines.

Industrially obtainable amine compounds for use as emulsifiers are often derived from the epoxidation of olefinically unsaturated hydrocarbon compounds with subsequent introduction of the N function by addition to the epoxide group. The reaction of the epoxidized intermediate components with primary or secondary amines to form the corresponding alkanolamines is of significance in this regard. Polyamines, particularly lower polyamines of the corresponding alkylenediamine type, are also suitable for opening of the epoxide ring.

Another class of the oleophilic amine compounds useful as emulsifiers are aminoamides derived from preferably long-chain carboxylic acids and polyfunctional, particularly lower, amines of the above-mentioned type. The key factor in their case is that at least one of the amino functions is not bound in amide form, but remains intact as a potentially salt-forming basic amino group. The basic amino groups, where they are formed as secondary or tertiary amino groups, may contain hydroxyalkyl substituents and, in particular, lower hydroxyalkyl substituents containing up to 5 and preferably up to 3 C atoms in addition to the oleophilic part of the molecule.

Suitable N-basic starting components for the preparation of such adducts containing long-chain oleophilic molecule constituents are monoethanolamine or diethanolamine.

Weighting materials are also often used to weight the well bore fluids of the invention to a density in the preferred range from about 8 to 18 pounds per gallon and greater. Weighting materials well known in the art include barite, ilmenite, calcium carbonate, iron oxide and lead sulfide. The preferred weighting material is commercially available barite.

Organophilic Clays. Organoclays made from bentonite, hectorite and attapulgite clays can be added to the inventive drilling fluids. There are a large number of suppliers of such clays in addition to Elementis Specialties' BENTONE® product line including Rockwood Specialties, Inc. and Sud Chemie GmbH. Although organoclay can be a useful component, it is not a necessary component of the drilling fluid.

Blending Process

Drilling fluids preparations preferably contain between ¼ and 15 pounds of the inventive mixture per barrel of fluids, more preferred concentration is ¼ to 10 pounds-per-barrel and most preferably ¼ to 5 pounds-per-barrel.

As shown above, a skilled artisan will readily recognize that additional additives: weighting agents, emulsifiers, wetting agents, viscosifiers, fluid loss control agents, and other agents can be used with this invention. A number of other additives besides rheological additives regulating viscosity and anti-settling properties, providing other properties, can also be used in the fluid so as to obtain desired application properties, such as, for example, anti-settling agents and fluid loss-prevention additives.

The drilling fluids of the present invention generally have a lower viscosity at 40° F. than conventional muds formulated with sufficient organoclay to provide suspension at bottom hole temperatures. When used in drilling operations, the present drilling fluids allow the use of a lower pumping power to pump drilling muds through long distances, thereby reducing down-hole pressures. Consequently, fluid loss, fracturing and damage of the formation are all minimized. Drilling fluids of the present invention also advantageously maintain the suspension characteristics typical of higher levels of organoclays at higher temperatures. The present invention is particularly useful in deep water drilling when the mud is cooled in the riser. A mud using the described invention will maintain a reduced viscosity increase in the riser when compared to drilling fluids containing conventional rheological additives.

EXAMPLES

Example 1

Preparation of the Polyamide Reaction Product

Empol® 1061 (792.9 grams) was placed in a 2 liter, 4-neck, preweighed reactor equipped with a Barrett distilling receiver and a Friedrichs condenser. The Empol® 1061 was heated to 100° C. and then diethylenetriamine (190.6 grams) was added. The contents were heated to 240° C. under a nitrogen blanket while mixing at 300 RPM. A reaction occured with the liberation of water, which was condensed in a receiver. The reaction was allowed to continue until the acid value was ≦2.0 (mg KOH/gram). The reaction was halted and the reactor reweighed. A sample was taken, labeled Sample A, and given a lot number for further studies.

Example 2

Preparation of Inventive Mixture Using the Product of Example 1

Sample A was allowed to cool to 80° C. under agitation. Ethomeen® C/15 (821.8 grams) was added slowly while mixing at 500 RPM. The composition was mixed for 15 minutes. All of the Ethomeen® C/15 was incorporated into the mixture. The resulting product was poured into an appropriate storage container.

Example 3

Preparation of Reaction Product 2

Empol® 1008 (635.2 grams) and Ethomeen® C/15 (692.1 gram) were placed in a 2 liter, 4-neck, preweighed reactor equipped with a Barrett distilling receiver and Friedrichs condenser. The contents were heated to 240° C. under a nitrogen blanket while mixing at 300 rpm. The reaction was allowed to continue until the acid value was ≦5.0 (mg KOH/grams). Once the acid value was ≦5.0, diethylenetriamine (112.6 grams) was charged to the reactor. The reaction continued for another two hours at 240° C. After this time, Armid® HT (164.0 grams) was added to the reactor and cooked for an additional 3 hours at 240° C. The resulting product was poured into storage containers.

Example 4

Preparation of Drilling Fluid and Various Tests

A typical test mud was prepared comprised of a synthetic base oil (186 grams), primary emulsifier (4 grams), secondary emulsifier (2 grams), 30% calcium chloride brine solution (75 grams) and lime (4 grams). All components were mixed together for 15 minutes. The test additive(s) was charged to the fluid and mixed for an additional 15 minutes. Barite (215 grams) was next added and the fluid mixed for another 15 minutes, total mixing time was 45 minutes. Properties of the resulting test mud were measured and evaluated.

After initial make up of all the drilling fluid (mud) and characterization was completed (120° F.), the drilling fluid (mud) was subjected to a thermal treatment at 150° F. for 16 hours. Drilling fluid (mud) properties were measured at 40° F., 120° F., and 180° F. as per API RP 13-B standard practices.

A. Table 1 Summary

TABLE 1

| Drilling Fluid Formulation | |
| --- | --- |
| Mud Formulation | Lbs./BBL |
| Synthetic Based Oil | 186 |
| Primary Emulsifier | 4 |
| Secondary Emulsifier | 2 |
| 30% Calcium Chloride Brine | 75 |
| Lime | 4 |
| Rheological Additive | See Tables for Concentrations |
| Barite | 215 |

A drilling mud formula for the purpose of evaluating a Theological additive performance.

B. Table 2 Summary

This below table represents a Bentone® 155 concentration study in a synthetic oil-based invert emulsion drilling fluid (mud). Table 2 shows that an oil-based drilling mud incorporating organoclay alone as a rheological modifier exhibits greater than 190% high shear rate viscosity increase at 4 ppb rheological agent when the temperature is reduced from 120° F. to 40° F. The drilling mud exhibits greater than a 160% low shear rate viscosity increase at 4 ppb rheological agent when the temperature is reduced from 120° F. to 40° F.

TABLE 2

| Additive Concentration OFI 800 Viscosity | 2 ppb | | | 4 ppb | | | 6 ppb | | |
| --- | --- | --- | --- | --- | --- | --- | --- | --- | --- |
| Test Temperature | 40° F. | 120° F. | 180° F. | 40° F. | 120° F. | 180° F. | 40° F. | 120° F. | 180° F. |
| 600 RPM Reading | 113 | 48 | 36 | 169 | 58 | 37 | 215 | 87 | 62 |

BENTONE® 155 CONCENTRATION EVALUATION
Rheological Additive BENTONE® 155

TABLE 2-continued

BENTONE ® 155 CONCENTRATION EVALUATION
Rheological Additive BENTONE ® 155

| Additive Concentration OFI 800 Viscosity | 2 ppb | | | 4 ppb | | | 6 ppb | | |
|---|---|---|---|---|---|---|---|---|---|
| Test Temperature | 40° F. | 120° F. | 180° F. | 40° F. | 120° F. | 180° F. | 40° F. | 120° F. | 180° F. |
| 300 RPM Reading | 69 | 30 | 22 | 110 | 39 | 25 | 158 | 59 | 42 |
| 200 RPM Reading | 53 | 23 | 18 | 88 | 32 | 19 | 133 | 50 | 35 |
| 100 RPM Reading | 36 | 16 | 12 | 65 | 24 | 14 | 99 | 38 | 26 |
| 6 RPM Reading | 13 | 6 | 3 | 26 | 10 | 6 | 48 | 20 | 14 |
| 3 RPM Reading | 13 | 5 | 2 | 25 | 9 | 6 | 45 | 18 | 13 |
| Apparent Visc., cPs | 57 | 24 | 18 | 85 | 29 | 19 | 108 | 44 | 31 |
| Plastic Visc., cPs | 44 | 18 | 14 | 59 | 19 | 12 | 57 | 38 | 20 |
| Yield Point, Lbs./100 Ft$^2$ | 25 | 12 | 8 | 51 | 20 | 13 | 101 | 31 | 22 |

C. Table 3 Summary:

TABLE 3

Impact of Example 2 on Viscosity:Temperature Profile
Additive Concentration:
BENTONE 155 (2.0 ppb)/Example 2 (1.0 ppb)

| OFI 800 Viscosity Test Temperature | 40° F. | 120° F. | 180° F. |
|---|---|---|---|
| 600 RPM Viscosity | 84 | 48 | 35 |
| 300 RPM Viscosity | 50 | 31 | 24 |
| 200 RPM Viscosity | 40 | 25 | 20 |
| 100 RPM Viscosity | 27 | 19 | 15 |
| 6 RPM Viscosity | 12 | 9 | 6 |
| 3 RPM Viscosity | 11 | 8 | 5 |
| Apparent Visc., cPs | 42 | 24 | 18 |
| Plastic Visc., cPs | 34 | 17 | 11 |
| Yield Point, Lbs./100 Ft$^2$ | 16 | 14 | 13 |

Table 3 presents the effect of the product of Example 2 on the viscosity of an oil-based drilling mud. When 0.5 ppb of the additive is combined with 2 ppb of BENTONE® 155, the 600 rpm Fann reading only increases by 75% (48 to 84) when the temperature is reduced from 120° F. to 40° F. Two ppb of the BENTONE alone gave rise to a 135% increase (Table 2) under comparable conditions. The low shear rate viscosity, measured at 6 rpm, showed a 33.3% viscosity increase as the temperature was reduces whereas the BENTONE alone provided a 115% increase.

D. Table 4 Summary

Table 4 below presents the effects of the product of Example 3 on the viscosity of an oil-based drilling mud. When 1 ppb of the additive is used along with 3 ppb of BENTONE® 155, the 600 rpm Fann reading only increases by 56.9% (65 to 102) when the temperature is reduced from 120° F. to 40° F. Four ppb of the BENTONE alone gave rise to a 190% increase. The low shear rate viscosity, measured at 6 rpm, showed a 29.4% viscosity decrease as the temperature was reduced.

TABLE 4

Impact of Example 3 on Viscosity:Temperature Profile
Additive Concentration
BENTONE 155 (3.0 ppb)/Example 3 (1.0 ppb)

| OFI 800 Viscosity Test Temperature | 40° F. | 120° F. | 180° F. |
|---|---|---|---|
| 600 RPM Reading | 102 | 65 | 50 |
| 300 RPM Reading | 63 | 44 | 36 |
| 200 RPM Reading | 48 | 36 | 30 |
| 100 RPM Reading | 31 | 28 | 24 |
| 6 RPM Reading | 12 | 17 | 15 |
| 3 RPM Reading | 11 | 16 | 14 |
| Apparent Visc., cPs | 51 | 33 | 25 |
| Plastic Visc., cPs | 39 | 21 | 14 |
| Yield Point, lbs./100 ft$^2$ | 24 | 23 | 22 |

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A composition comprising: a) a reaction product of (i) a dimer fatty acid and (ii) a polyethylene polyamine having an amine functionality of two or more; and b) a chemical selected from the group consisting of (i) alkoxylated alkyl amines, (ii) fatty acid amides and (iii) mixtures thereof.

2. The composition of claim 1, wherein the dimer fatty acid is selected from the group consisting of hydrogenated, partially hydrogenated and non-hydrogenated dimer acids with from about 20 to about 48 carbon atoms.

3. The composition of claim 1, wherein the polyethylene polyamine is selected from the group consisting of ethylenediamine, diethylenetriamine, triethylenetriamine and tetraethylenepentamine.

4. The composition of claim 1, wherein the polyethylene polyamine is diethylenetriamine.

5. The composition of claim 1, wherein the (i) alkoxylated alkyl amine is an ethoxylated fatty amine.

6. The composition of claim 5, wherein the ethoxylated fatty amine is an ethoxylated (5) cocoalkyl amine.

7. The composition of claim 1, further comprising an organoclay.

8. An oil based drilling fluid comprising the composition of claim 1.

9. The drilling fluid of claim 8, further comprising an organoclay.

10. The drilling fluid of claim 8, further comprising one or more emulsifiers.

11. An oil based drilling fluid comprising (A) a water in oil emulsioin, and (B) a rheological additive which is a composition of claim 1.

12. The oil based drilling fluid of claim 8, wherein the oil based drilling fluid is rheologically active.

13. A composition comprising the reaction product of a) a carboxylic acid with at least two carboxylic moieties b) a polyamine having an amine functionality of two or more, c) an alkoxylated alkyl amine and d) a fatty acid amide.

14. An oil-based drilling fluid comprising the composition of claim 13.

15. The drilling fluid of claim 14 further comprising an organoclay.

16. The drilling fluid of claim 13, further comprising one or more emulsifiers.

17. A composition comprising: a) a reaction product of(i) a carboxylic acid with at least two carboxylic moieties, (ii) a polyamine having an amine functionality of two or more and (iii) an alkoxylated alkyl amine; and b) a fatty acid amide.

18. An oil based drilling fluid comprising the composition of claim 17.

19. The drilling fluid of claim 18 further comprising an organoclay.

* * * * *